United States Patent
Gupta

(10) Patent No.: US 7,200,620 B2
(45) Date of Patent: Apr. 3, 2007

(54) HIGH AVAILABILITY DATA REPLICATION OF SMART LARGE OBJECTS

(75) Inventor: Ajay K. Gupta, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/674,149

(22) Filed: Sep. 29, 2003

(65) Prior Publication Data

US 2005/0071389 A1  Mar. 31, 2005

(51) Int. Cl.
G06F 12/00 (2006.01)
G06F 17/30 (2006.01)

(52) U.S. Cl. .................................................. 707/201

(58) Field of Classification Search ............ 707/100 S, 707/200 S
See application file for complete search history.

(56) References Cited

U.S. PATENT DOCUMENTS

| | | | |
|---|---|---|---|
| 5,937,415 A | | 8/1999 | Sheffield et al. |
| 6,457,065 B1 | | 9/2002 | Rich et al. |
| 6,578,056 B1 | * | 6/2003 | Lamburt .................. 715/500.1 |
| 6,615,219 B1 | * | 9/2003 | Bruso et al. ................. 707/102 |
| 2003/0037029 A1 | * | 2/2003 | Holenstein et al. ............ 707/1 |
| 2003/0208511 A1 | * | 11/2003 | Earl et al. .................... 707/204 |
| 2004/0267843 A1 | * | 12/2004 | Dinh et al. ................. 708/204 |

* cited by examiner

*Primary Examiner*—John Cottingham
*Assistant Examiner*—Dennis Vautrot
(74) *Attorney, Agent, or Firm*—James A. Lucas; Driggs, Hogg & Fry Co., LPA

(57) ABSTRACT

In a database, a high availability data replicator (28, 46, 48) synchronizes primary and secondary servers (10, 30). A smart large object application program interface (82) resides on the secondary server (30). A cache module (108) creates a memory cache (88) corresponding to a smart large object responsive to a smart large object read operation requested by a client (86). A smart large object read module (110) executes the read operation without acquiring a lock on the corresponding smart large object. An exception module (102) sends an exception to the client (86) responsive to a synchronizing event of the high availability data replicator (28, 46, 48) modifying said smart large object. On the primary server (10), log entries of the modifying operation are ordered so that a log entry updating a large object header of said smart large object is consistent immediately upon execution on the secondary server (30).

16 Claims, 2 Drawing Sheets

HIGH AVAILABILITY DATA REPLICATION OF SMART LARGE OBJECTS

BACKGROUND OF THE INVENTION

1. Field of the Invention

The present invention relates to the art of information processing. It finds particular application in high availability database systems employing smart large objects, and will be described with particular reference thereto. However, the present invention is useful in integrating other data objects stored outside the primary database space with high availability backup and load-sharing database systems.

2. Description of Related Art

High availability data replication provides a hot backup secondary server that is synchronized with a primary database server. Data replication is achieved by transferring log entries of database transactions from the primary server to the secondary server, where they are replayed to provide the synchronization. Besides providing a hot backup, the secondary server advantageously provides read-only access to the database, which permits client load to be balanced between the primary and secondary servers.

A problem arises, however, in synchronizing smart large objects using high availability data replication. A smart large object includes a dedicated space that stores binary or textual content in a random access format. Smart large objects that store binary data are called smart binary large objects (smart BLOB's), while smart large objects that store textual content are called smart character large objects (smart CLOB's). Smart large objects expand the capabilities of the database system by enabling clients to selectively access data from a large block of data without acquiring the entire block of data. Smart BLOB's are particularly flexible insofar as they impose substantially no limitations on the type of stored binary data. Thus, a smart BLOB can contain an image, audio recording, spreadsheet, or otherwise-formatted data in a random access format adapted for a particular client application.

However, smart large objects are not compatible with high availability data replication. Inconsistencies in replicating transactions involving smart large objects arise from interference by other transactions that access the smart large object, including client read-only access requests. Moreover, client reads can be corrupted if the log replay process updates or deletes the smart large object during the read operation. Because of such difficulties, high availability data replication heretofore has been limited to database systems that do not employ smart large objects.

The present invention contemplates an improved method and apparatus which overcomes these limitations and others.

SUMMARY OF THE INVENTION

In accordance with one aspect, a method is performed in a database including primary and secondary servers and a replicator that copies database log entries between the primary server and the secondary server and replays said log entries on the secondary server. A transaction is initiated on the secondary server that includes reading a smart large object. Responsive to the initiating, a memory cache corresponding to the smart large object is created. Said memory cache includes a large object header. Responsive to a replay on the secondary server of a log entry that alters said smart large object, an exception is sent to said transaction.

In accordance with another aspect, in a database including primary and secondary servers and a high availability data replicator adapted to synchronize the secondary server with the primary server, a smart large object application program interface resides on the secondary server. A smart large object read module is adapted to read data from a smart large object without acquiring a lock on said smart large object. Said read data is communicated to a client. An exception module is adapted to send an exception to said client responsive to a synchronizing event of the high availability data replicator modifying said smart large object.

In accordance with yet another aspect, an article of manufacture comprising one or more non-volatile storage media encodes instructions for performing a high availability data replication process that synchronizes a secondary server with a primary server of a database that includes smart large objects. The process includes: ordering log entries of a smart large object modifying operation performed on the primary server in a selected order wherein a log entry corresponding to updating a large object header of said smart large object is consistent immediately upon execution; transferring log entries including said log entries of said smart large object modifying operation from the primary server to the secondary server; and replaying said transferred log entries on the secondary server, the replaying of said log entries of said smart large object modifying operation being performed in the selected order without locking said smart large object on the secondary.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

DETAILED DESCRIPTION OF THE PREFERRED EMBODIMENTS

Figure 1:
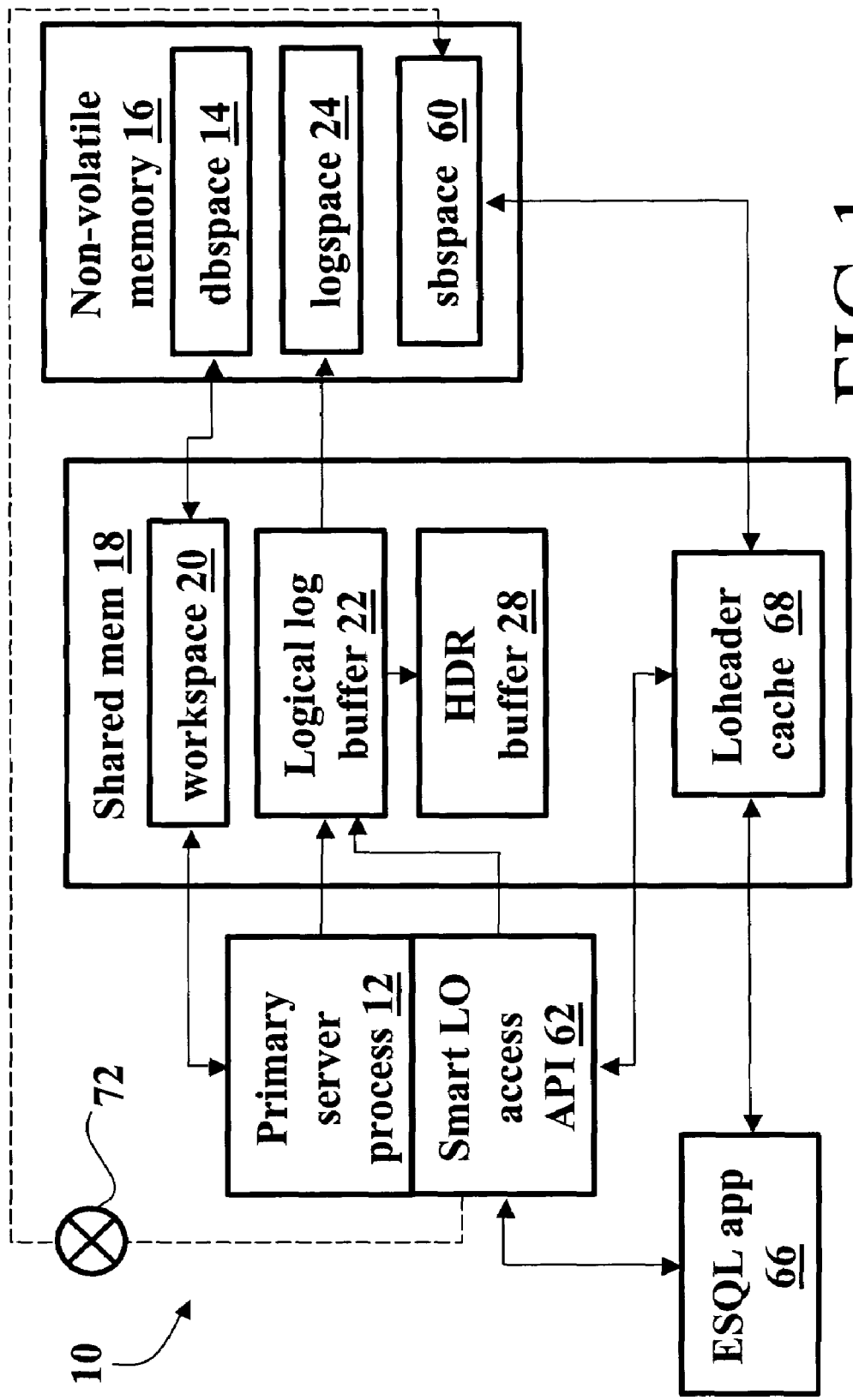
FIG. 1 shows a block diagram of a primary server side of a database system that includes high availability data replication and smart large objects.

With reference to FIG. 1, a primary server side 10 of a database system includes a primary server process 12, which can execute on a server computer, mainframe computer, high-end personal computer, or the like. The primary server process 12 maintains a primary database space 14 on a non-volatile storage medium 16, which can be a hard disk, optical disk, or other type of storage medium. The server 12 executes a suitable database system program, such as an IBM Informix Dynamic Server program or a DB2 database program, both available from IBM Corporation, or the like, to create and maintain the primary database. The database is suitably configured as one or more tables describable as having rows and columns, in which database entries or records correspond to the rows and each database entry or record has fields corresponding to the columns. The database can be a relational database, a hierarchal database, a network database, an object relational database, or the like.

Portions of the database contents, or copies thereof, typically reside in a more rapidly accessible shared random access memory 18, such as a random access memory (RAM). For example, a database workspace 20 stores database records currently or recently accessed or created by database operations. The server 12 preferably executes database operations as transactions each including one or more statements that collectively perform a database operation. A transaction optionally acquires exclusive or semi-exclusive access to rows or records read or modified by the transaction by acquiring a lock on such rows or records. A lock prevents other transactions from changing content of the locked row or record to ensure data consistency during the transaction.

A transaction can be committed, that is, made irrevocable, or can be rolled back, that is, reversed or undone, based on whether the statements of the transaction successfully executed and optionally based on other factors such as whether other related transactions successfully executed. Rollback capability is provided in part by maintaining a transaction log that retains information on each transaction. Typically, a logical log buffer 22 maintained in the shared memory 18 receives new transaction log entries as they are generated, and the logical log buffer 22 is occasionally flushed to a log space 24 on the non-volatile storage 14 for longer term storage. In addition to enabling rollback of uncommitted transactions, the transaction log also provides a failure recovery mechanism. In the event of a database failure, the stored logs can be replayed so as to recreate lost transactions.

Figure 2:
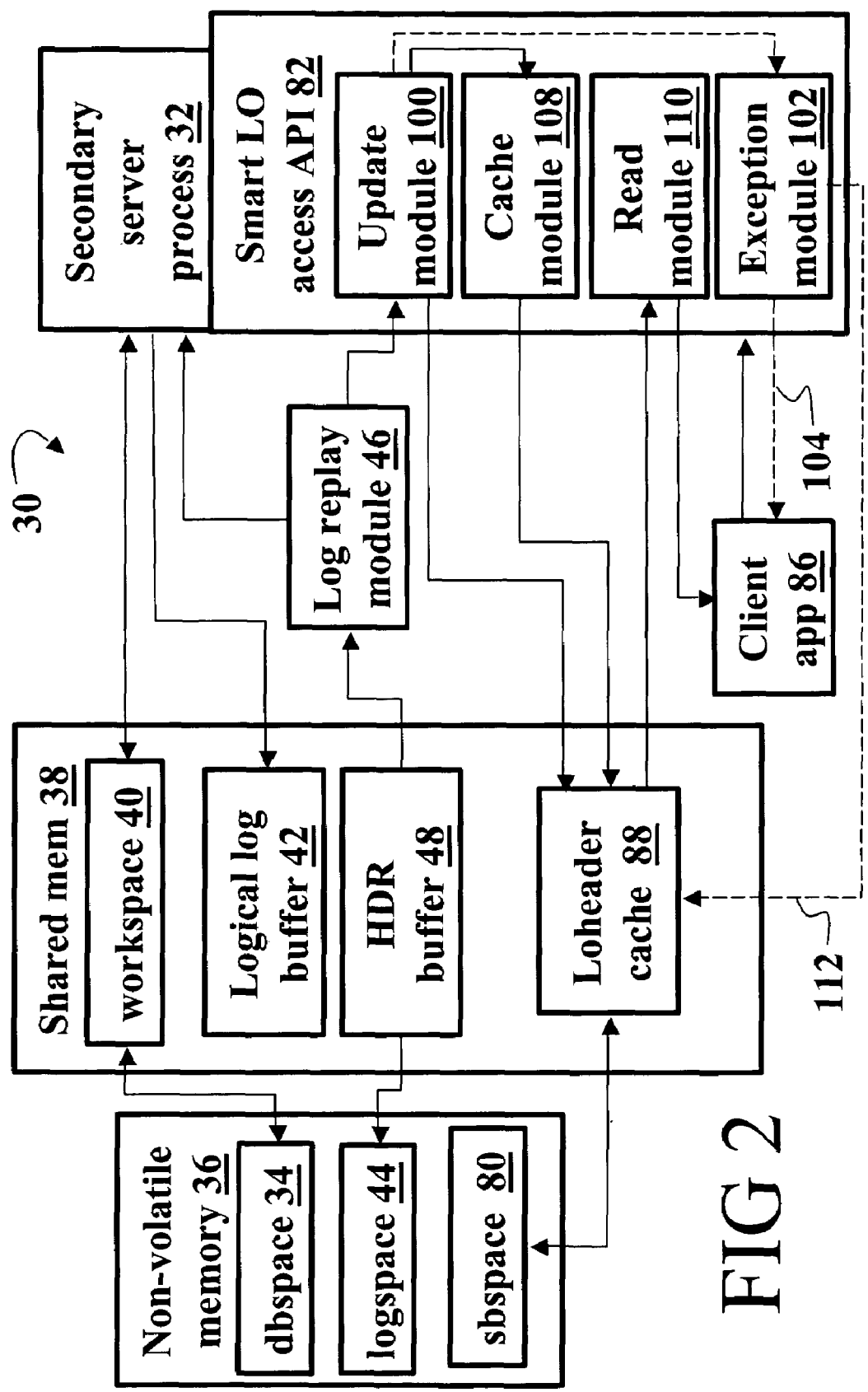
FIG. 2 shows a block diagram of a secondary server side of the database system.

With continuing reference to FIG. 1 and with further reference to FIG. 2, to provide further reliability and robustness of the database, a high availability data replicator maintains a synchronized duplicate database on a secondary server side 30. As shown in FIG. 2, the secondary server side 30 includes a secondary server process 32 that maintains a secondary database space 34 on a non-volatile storage medium 36. A shared random access memory 38 contains a database workspace 40 for the secondary database, and a logical log buffer 42 holding transaction logs of transactions occurring on the primary server 10, which are occasionally transferred to a log space 44 on the non-volatile storage medium 36 for longer term storage of transaction logs. Preferably, the secondary side 30 is physically remote from the primary side 10. For example, the primary and secondary sides 10, 30 can be in different buildings, different cities, different states, or even different countries. This preferred geographical remoteness enables the database system to survive even a regional catastrophe. Although geographical remoteness is preferred, it is also contemplated to have the primary and secondary sides 10, 30 more proximately located, for example in the same building or even in the same room.

The high availability data replicator includes a high availability data replicator (HDR) buffer 28 on the primary side 10, a high availability data replicator (HDR) buffer 48 on the secondary side 30, and a log replay module 46 on the secondary side. The high availability data replicator (HDR) buffer 28 on the primary side 10 receives copies of the data log entries from the logical log buffer 22. Contents of the data replicator buffer 28 on the primary side 10 are occasionally transferred to the high availability data replicator (HDR) buffer 48 on the secondary side 30. On the secondary side 30, the log replay module 46 replays the transferred log entries stored in the replicator buffer 48 to duplicate the transactions corresponding to the transferred logs on the secondary side 30.

Preferably, the logical log buffer 22 on the primary side 10 is not flushed to the log space 24 on the non-volatile storage medium 16 until the primary side 10 receives an acknowledgment from the secondary side 30 that the log records were received from the data replicator buffer 28. This approach ensures that substantially no transactions committed on the primary side 10 are left uncommitted or partially committed on the secondary side 30 if a failure occurs. Optionally, however, contents of the logical log buffer 22 on the primary side 10 can be flushed to the log space 24 on non-volatile memory 16 after the contents are transferred to the data replicator buffer 28.

Users access the primary side 10 of the database system to perform database read and database write operations. As transactions execute on the primary side 10, transaction log entries are created and transferred by the high availability data replicator to the secondary side 30 where they are replayed to maintain synchronization of the duplicate database on the secondary side 30 with the primary database on the primary side 10. In the event of a failure of the primary side 10 (for example, a hard disk crash, a lost network connection, a substantial network delay, a catastrophic earthquake, or the like) user connections are switched over to the secondary side 30. Moreover, the secondary side 30 also provides read-only access to the database to help balance user load between the primary and secondary servers 10, 30.

The database includes smart large objects, such as smart binary large objects (smart BLOB's) and smart character large objects (smart CLOB's). Smart large objects expand the capabilities of the database system by enabling definition of large segments of storage that can be randomly accessed by the user. That is, the user can access selected content of the smart large object without retrieving the entire object.

A smart BLOB stores substantially any type of binary data, such as spreadsheets, program-load modules, digitized voice patterns, images, and so forth, in a random access format. A smart CLOB is similar to a smart BLOB, but is typically limited to character content. Smart CLOB's are used to store large text files such as lists, description paragraphs, and the like, in a random access format.

Smart large objects are stored and accessed in a different manner from other database content. Referring to the primary side 10, smart large object data is stored in a smart large object space 60 on the non-volatile memory 16. A smart large object access application program interface (API) 62 serves as an interface for randomly accessing content of smart large objects stored in the smart large object space 60. In the illustrated embodiment, an ESQL application 66 executing on the primary side 10 accesses a smart large object via the smart large object access API 62. To provide rapid random access to a smart large object, a large object header cache 68 or other memory cache corresponding to the smart large object is created in shared random access memory 18.

Similarly, on the secondary side 30, smart large object data is stored in a smart large object space 80 on the non-volatile memory 36. A smart large object access application program interface (API) 82 serves as an interface for randomly accessing content of smart large objects stored in the smart large object space 80. In the illustrated embodiment, a client application 86 executing on the secondary side 30 accesses a smart large object in read-only mode via the smart large object access API 82. To provide rapid random read access to a smart large object, a large object header cache 88 or other memory cache corresponding to the smart large object is created in shared random access memory 38.

On the primary side 10, operations performing read or write access to a smart large object preferably acquire a lock 72 on the smart large object to ensure data consistency. For example, when the ESQL application 66 accesses a smart large object to perform a modification, deletion, or data read of the smart large object, the smart large object access API 62 acquires the lock 72 on the smart large object in the smart large object space 60.

On the secondary side 30, database access is limited to read-only operations. When the client application 86 accesses a smart large object via the smart large object access API 82 to perform a data read, a "dirty" read is preferably performed in which no lock on the smart large object is obtained. Client-initiated locks on the secondary side can potentially interfere with log replay operations performed by the log replay module 46.

To ensure data consistency on the secondary side 30, several measures are preferably taken. On the primary side 10, the smart large object access API 62 preferably orders log entries of each smart large object modifying operation in a selected order such that the log entry corresponding to updating of a large object header is consistent immediately upon execution. On the secondary side 30, the log entries of each smart large object modifying operation are replayed in that same selected order. This ensures that any large object header update replayed on the secondary side 30 is immediately consistent, even if subsequent log entries fail to be applied on the secondary side 30. The log entries are applied on the secondary side 30 without locking. It is possible that log entries subsequent to the large object header update log entry may fail to be applied. In one such case where subsequent log entries may fail to be applied, another transaction accesses the smart large object between the time of the large object header update and the attempted application of the subsequent log entries.

In the case of a smart large object modifying operation on the primary side 10 that allocates new space to the smart large object, the selected order is such that the space is first allocated, and then the large object header is updated. The log entries are replayed in that same order on the secondary side 30. This ensures that when the large object header is updated, the space is already allocated so that the updated large object header is immediately consistent with the accessible allocated memory.

In another example of selected ordering, when a smart large object modifying operation on the primary side 10 deallocates new space from the smart large object, the selected order is such that the large object header is first updated to indicate the deallocation, and then the space is deallocated. The log entries are replayed in that same order on the secondary side 30. This ensures that the header does not incorrectly indicate allocated space that is no longer allocated to the smart large object.

The opposite order, in which the space is first deallocated and then the header is updated, could result in an inconsistency if the deallocation is applied but the subsequent header update fails to be applied. In such a circumstance, a future read operation attempting to access content from the deallocated space will incorrectly determine from the header that the deallocated space is still available.

Another measure preferably taken to ensure data consistency is to provide an exception to the client application 86 in the event that a log replay operation modifies the smart large object during the dirty read operation associated with the client application 86. An update module 100 of the smart large object access API 82 on the secondary side 30 performs the smart large object modification. Before performing the updating, the update module 100 determines whether there are any client applications, such as the exemplary client application 86, which are in the process of reading data from the smart large object to be updated. If such a conflict exists, the update module 100 triggers an exception module 102 to send an exception 104 to the client application 86.

Further processing depends upon the type of modification performed on the smart large object and the corresponding type of exception 104 sent by the exception module 102. For most types of modifications, exception 104 is an error code sent to the client application 86. The update module 100 performs the update of the smart large object and then communicates the update to a cache module 108 that created and maintains the large object header cache 88 associated with the dirty read operation. The client application 86 responds to the error code 104 by reinitiating the dirty read, which a read module 110 of the smart large object access API 82 executes once the large object header cache 88 is updated by the cache module 108.

If the modification is a delete operation that deletes the smart large object, then the exception 104 is preferably replaced by an invalidation 112 that invalidates the large object header cache 88. This invalidation is appropriate since the smart large object is deleted and no longer can be accessed. The client application 86 suitably responds to the invalidation 112 by producing a suitable failure error code. Optionally, the invalidation 112 is accompanied by exception 104 which directly tells the client application 86 that the dirty read has failed.

The database system and processing is typically implemented using one or more computer programs, each of which executes under the control of an operating system, such as OS/2, Windows, DOS, AIX, UNIX, MVS, or so forth, and causes one or more computers to perform the desired database processing including high availability data replication and smart large object processing as described herein. Thus, using the present specification, the database system and processing may be implemented as a machine, process, or article of manufacture by using programming and/or engineering techniques to produce software, firmware, hardware or any combination thereof.

Generally, the computer programs and/or operating system are all tangibly embodied in one or more computer-readable devices or media, such as memory, data storage devices, and/or data communications devices, thus making a computer program product or article of manufacture according to the invention. As such, the term "article of manufacture" as used herein is intended to encompass a computer program accessible from any computer readable device, media, computer network, or the like.

Moreover, the computer programs and operating system are comprised of instructions which, when read and executed by one or more computers, cause said computer or computers to perform operations to implement the database processing including high availability data replication and smart large object processing as described herein. Under control of the operating system, the computer programs may be loaded from the memory, data storage devices, and/or data communications devices into the memories of said computer or computers for use during actual operations. Those skilled in the art will recognize many modifications may be made to this configuration without departing from the scope of the present invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, what is claimed is:

1. In a database including a read/write primary and a read-only secondary server, and a high availability data replicator that copies database log entries from the primary server to the secondary server and replays said log entries on the secondary server consistent with the log entries on the primary server, a method comprising:
   initiating a transaction on the secondary server that includes reading a smart large object, the transaction initiated without locking the smart large object on the secondary server;
   responsive to the initiating, creating a memory cache on the secondary side corresponding to the smart large object, said memory cache including a large object header; and
   responsive to a replay on the secondary server of a log entry by said replicator that alters said smart large object, sending an exception to said initiated transaction.

2. The method as set forth in claim 1, further comprising:
   committing said replay of said log entry on the secondary server to alter said smart large object on the secondary server;
   updating said large object header to generate an updated large object header; and
   completing said transaction using said updated large object header.

3. The method as set forth in claim 2, wherein the sending of an exception to said transaction comprises:
   sending an error code to a user read thread that generated said transaction.

4. The method as set forth in claim 1, further comprising:
   committing said replay of said log entry on the secondary server to delete said smart large object on the secondary server; and
   invalidating said large object header.

5. The method as set forth in claim 1, further comprising:
   allocating new space to said smart large object on the primary server, the allocating including:
      allocating a memory page on the primary server to provide said new space, and
      subsequent to the allocating of a memory page, updating a header of the smart large object on the primary server;
   wherein the allocating of the memory page and the updating of the header are logged on the primary server to define at least a portion of said log entry that alters said smart large object.

6. The method as set forth in claim 1, further comprising:
   deallocating memory from said smart large object on the primary server, the deallocating including:
      updating a header of the smart large object on the primary server, and
      subsequent to the updating, deallocating said memory;
   wherein the updating and deallocating are logged on the primary server to define at least a portion of said log entry that alters said smart large object; and
   updating the header and deallocating the memory on the secondary side in the same order as on the primary side.

7. The method as set forth in claim 1, wherein the initiating of a transaction on the secondary server that includes reading a smart large object comprises:
   initiating a transaction on the secondary server that includes reading one of a smart binary large object (smart-BLOB) and a smart character large object (smart-CLOB).

8. The method as set forth in claim 1, further comprising:
   performing a modifying transaction on the primary server that alters said smart large object; and
   logging said modifying transaction on the primary server to generate at least a portion of said log entry that alters said smart large object.

9. The method as set forth in claim 8, wherein the performing of said modifying transaction comprises:
   acquiring a lock on said smart large object on the primary server.

10. The method as set forth in claim 1 wherein the primary server contains database workspace that it shares with the secondary server.

11. In a database including a primary and a secondary server and a high availability data replicator adapted to synchronize the secondary server with the primary server, a smart large object application program interface residing on the secondary server, the smart large object application program interface comprising:
   a smart large object read module adapted to read data from a smart large object without acquiring a lock on said smart large object, said read data being communicated to a client;
   an exception module adapted to send an exception to said client responsive to a synchronizing event of the high availability data replicator modifying said smart large object;
   an update module adapted to update said smart large object responsive to said synchronizing event; and
   a cache module adapted to create a memory cache of said smart large object, said smart large object read module accessing said memory cache during a read, said cache module being further adapted to update said memory cache responsive to said updating of said large smart object.

12. An article of manufacture comprising one or more non-volatile storage media encoding instructions for performing a high availability data replication process that synchronizes a secondary server with a primary server of a database that includes smart large objects, the process comprising:
   ordering log entries of a smart large object modifying operation performed on the primary server in a selected order wherein a log entry corresponding to updating a large object header of said smart large object is consistent immediately upon execution;
   transferring log entries including said log entries of said smart large object modifying operation from the primary server to the secondary server;
   identifying a read operation accessing said smart large object, and communicating an exception and error code to a client associated with the read operation;
   replaying said transferred log entries on the secondary server, the replaying of said log entries of said smart large object modifying operation being performed in the selected order without locking said smart large object on the secondary server, thereby insuring consistency of the data being transferred from the primary server to the secondary server, wherein the replaying of the log entries includes modifying said smart large object on the secondary server; and
   communicating an exception including said error code to said client.

13. The article of manufacture as set forth in claim 12, wherein:

the replaying of said log entries of said smart large object modifying operation includes deleting said smart large object on the secondary server; and the communicating of an exception includes invalidating a large object header associated with said read operation.

14. The article of manufacture as set forth in claim 12, wherein said smart large object modifying operation includes allocating memory to said smart large object, and said ordering comprises:

ordering a log entry corresponding to allocation of memory before a log entry corresponding to updating a header of the smart large object, whereby replaying of said log entries of said smart large object modifying operation on the secondary server in the selected order allocates memory on the secondary server before updating said header on the secondary server.

15. The article of manufacture as set forth in claim 12, wherein said smart large object modifying operation includes deallocating memory from said smart large object, and said ordering comprises:

ordering a log entry corresponding to updating a header of the smart large object before a log entry corresponding to deallocation of memory, whereby replaying of said log entries of said smart large object modifying operation on the secondary server in the selected order updates said header on the secondary server before deallocating memory on the secondary server.

16. The article of manufacture as set forth in claim 12, wherein said ordering of log entries of a smart large object modifying operation comprises:

ordering log entries of one of:

a smart binary large object (smart BLOB) modifying operation, and a smart character large object (smart CLOB) modifying operation, performed on the primary server in a selected order wherein a log entry corresponding to updating a large object header of said smart large object is consistent immediately upon execution.

* * * * *